(12) United States Patent
Ulas et al.

(10) Patent No.: US 10,484,285 B2
(45) Date of Patent: Nov. 19, 2019

(54) SYSTEM, METHOD AND ARTICLE OF MANUFACTURE FOR USING CONTROL PLANE FOR CRITICAL DATA COMMUNICATIONS IN SOFTWARE-DEFINED NETWORKS

(71) Applicant: ARGELA YAZILIM VE BILISIM TEKNOLOJILERI SAN. VE TIC. A.S., Istanbul (TR)

(72) Inventors: Aydin Ulas, Istanbul (TR); Erhan Lokman, Istanbul (TR); Sinan Tatlicioglu, Istanbul (TR); Seyhan Civanlar, Istanbul (TR); Metin Balci, Istanbul (TR); Burak Gorkemli, Istanbul (TR); Bulent Kaytaz, Istanbul (TR)

(73) Assignee: ARGELA YAZILIM VE BILISIM TEKNOLOJILERI SAN. VE TIC. A.S. (TR)

( * ) Notice: Subject to any disclaimer, the term of this patent is extended or adjusted under 35 U.S.C. 154(b) by 287 days.

(21) Appl. No.: 14/984,928

(22) Filed: Dec. 30, 2015

(65) Prior Publication Data
US 2017/0195229 A1    Jul. 6, 2017

(51) Int. Cl.
*H04L 12/803* (2013.01)
*H04L 12/851* (2013.01)

(52) U.S. Cl.
CPC .......... *H04L 47/122* (2013.01); *H04L 47/24* (2013.01)

(58) Field of Classification Search
CPC ......... H04L 45/02; H04L 45/22; H04L 45/38; H04L 45/54; H04L 45/64; H04L 47/24; H04L 47/122
See application file for complete search history.

(56) References Cited

U.S. PATENT DOCUMENTS

| 2014/0098669 | A1* | 4/2014 | Garg | H04L 45/38 370/235 |
| 2014/0112150 | A1* | 4/2014 | Ko | H04L 47/24 370/236 |
| 2014/0122683 | A1* | 5/2014 | Zhao | H04L 45/64 709/223 |
| 2015/0281067 | A1* | 10/2015 | Wu | H04L 61/103 370/392 |

(Continued)

FOREIGN PATENT DOCUMENTS

WO    WO 2016/105330    *    6/2016    ............ H04L 12/28

*Primary Examiner* — Michael Thier
*Assistant Examiner* — Prince A Mensah
(74) *Attorney, Agent, or Firm* — IP Authority, LLC; Ramraj Soundararajan

(57) ABSTRACT

A novel system and a new data communication method are invented in a software-defined (SDN) network to provide delivery of certain types of critical data flows with certain QoS and/or extra security requirements in a congested network. The method of invention allows such critical data not to traverse the data plane, as it normally would, but instead to go from the ingress switch directly to the egress switch, thereby always in two hops using the control channels. By shortcutting all other switches along the traditional data path computed by normal routing, it potentially provides guaranteed throughput, lower latency/jitter or higher level of security.

21 Claims, 6 Drawing Sheets

(56) References Cited

U.S. PATENT DOCUMENTS

| | | | |
|---|---|---|---|
| 2016/0094395 A1* | 3/2016 | Hu | H04W 28/16 |
| | | | 370/254 |
| 2016/0112327 A1* | 4/2016 | Morris | H04L 47/127 |
| | | | 398/45 |
| 2016/0112728 A1* | 4/2016 | Kaushik | H04N 21/2385 |
| | | | 725/116 |
| 2016/0127975 A1* | 5/2016 | Hu | H04W 40/246 |
| | | | 455/445 |
| 2016/0197831 A1* | 7/2016 | De Foy | H04L 45/7453 |
| | | | 370/392 |
| 2017/0093722 A1* | 3/2017 | Gonzalez Castano | H04L 47/125 |
| 2017/0149659 A1* | 5/2017 | K | H04L 45/02 |
| 2018/0145902 A1* | 5/2018 | Grosso | H04L 47/2441 |

* cited by examiner

SYSTEM, METHOD AND ARTICLE OF MANUFACTURE FOR USING CONTROL PLANE FOR CRITICAL DATA COMMUNICATIONS IN SOFTWARE-DEFINED NETWORKS

BACKGROUND OF THE INVENTION

Field of Invention

The present invention relates a system and data communication method in a software defined network (SDN) and more specifically it relates to a special type of delivery of critical data.

Discussion of Related Art

Any discussion of the prior art throughout the specification should in no way be considered as an admission that such prior art is widely known or forms part of common general knowledge in the field.

Software defined network (SDN) is a recent networking paradigm and a strong candidate to become the architecture of the future Internet. SDN is decoupled into two planes; a data plane comprised of 'switches', which perform packet forwarding, and a control plane connecting all network switches to a 'controller', which calculates routing (or flow) tables and sends them to the switches. Doing so, the packet forwarding and route calculation tasks are decoupled. The switches perform fast packet forwarding while the controller performs fast calculation of routes. While switches are mainly special-purpose hardware devices designed for packet switching, the controller is a logically centralized software.

In SDN (see paper titled, "Software-Defined Networking," White paper, Open Networking Foundation, Apr. 13, 2012), data packets arriving at a network switch are forwarded according to the forwarding rules dictated by the flow table determined beforehand by the controller. By collecting information from each network switch, the controller knows the network topology and can determine the best forwarding paths using a routing method, which uses graph theoretical methods such as Dijkstra's shortest path (see book titled, "Dynamic Programming: Foundations and Principles," published by CRC Press, Sep. 10, 2010). If a switch doesn't have any existing forwarding rule in the flow table for a newly arrived data packet flow, it forwards the first few data packets of the flow to the controller seeking directives as to how to forward the flow. In return, the controller may send new forwarding rules for that specific flow to the ingress/originating switch and possibly to all other involved switches in the network, or a complete update of the entire flow table. Every data packet thereafter is forwarded from one switch to another according to the new flow table until it reaches its destination, or dropped. During the lifetime of a packet flow, the controller may decide to change the route of the flow by sending new instructions to switches along the data path.

When a user demands a fast delivery of a flow containing some critical data which may possibly need extra security, the controller needs to set up every switch along the path beforehand to meet the quality of service (QoS) and security requirements. Especially when the network is highly loaded or does not have sufficient capacity or protection, fast delivery and security requested for the critical data may not be met with traditional forwarding methods. In order to remedy such a situation, a new system and data communication method are proposed in our present invention which somewhat departs from the conventional SDN concepts of prior art.

Embodiments of the present invention are an improvement over prior art systems and methods.

SUMMARY OF THE INVENTION

The purpose of the present invention is to provide the critical data in an SDN with a fast and secure path to its final destination with minimal number of switching hops even when the data network resources are congested. In order to do so, the invention makes use of the reserved control channel between each network switch and the controller to send and receive such critical data—along with the normal control traffic. Although the control channel may have a limited bandwidth, primarily allocated for the control traffic, it may have enough capacity to carry critical data from time to time (i) to increase security, (ii) decrease latency/jitter, or (iii) to provide a steady and more predictable throughput. The critical data can be carried (i) in-band, i.e., within the control channel (e.g., using OpenFlow (see paper titled, "OpenFlow Switch Specification v1.5.1," Open Networking Foundation (ONF), ONF-TS-025, March 2015), or (ii) out-of-band, i.e., by sharing the transmission facilities of the control channel, but not within the control channel. A separate Virtual Circuit (e.g., using MIMS) is set up for the critical data.

The controller(s) passes around network control information, such as flow tables, using a 'control plane' network designed as a separate from the 'data plane' network, which carries the actual data traffic. The control plane, in general, is comprised of:

(i) The control channels between network switches and the controller(s) carrying Openflow messages; and (ii) The connections between the controllers of the same administrative domain (viz. intra-domain network) to pass around control messages, if there are more than one controller controlling the network; and (iii) The connections between the controllers of different administrative domains (viz. inter-domain network) to pass around summarized control messages across domains.

The control and data planes may be on the same physical facilities infrastructure, or possibly on completely disjoint infrastructure facilities. Of course, the decoupling of the control and data planes completely isolates the control network from being congested even under most loaded data network conditions. Congestion may occur in the data plane network because of (i) sudden but temporary increase of traffic load on certain routes, which may congest a few or several switches and possibly the entire facilities network; (ii) failure of one or more switches or facilities. The control network is designed such that it stays uncongested even when the data network is congested because of the critical control information it carries. Furthermore, the controller has a connection to every switch in the network forming a 'star' topology. So, any switch is indeed connected to any other switch in one hop via the control channel. In the inter-domain scenario, or in a network with multiple controllers, the controllers along the path may add extra hops between the ingress and egress switches if these are connected to different controllers. Note that any data traversing the control network as described above has a clear topological advantage due to inherent star topology as compared to any other possible path calculated using shortest path routing, hence the advantage of lower latency/jitter.

In one embodiment, the present invention provides a software defined network (SDN) controller communicating via a control plane and a data plane, the SDN controller comprising: a user interface receiving critical data flow requests; and an application logic processing the data flow requests and determining status and availability of capacity in the SDN to carry out each data flow request, and when status and/or availability of capacity in the SDN does not allow for a given data flow request to be completed and when the given data flow request is determined to be a critical data flow, the application logic utilizing a control channel in the control plane of the SDN to complete the critical data flow, and when status and/or availability of capacity in the SDN does allow for the given data flow request to be completed, the application logic utilizing a data channel in the data plane of the SDN to complete the given data flow request.

In another embodiment, the present invention provides a method as implemented to in a software defined network (SDN) controller, the SDN controller communicating via a control plane and a data plane, the method comprising: receiving critical data flow requests; and processing the data flow requests and determining status and availability of capacity in the SDN to carry out each data flow request, and when status and/or availability of capacity in the SDN does not allow for a given data flow request to be completed and when the given data flow request is determined to be a critical data flow, the application logic utilizing a control channel in the control plane of the SDN to complete the critical data flow, and when status and/or availability of capacity in the SDN does allow for the given data flow request to be completed, the application logic utilizing a data channel in the data plane of the SDN to complete the given data flow request.

In yet another embodiment, the present invention provides an article of manufacture having non-transitory computer readable storage medium comprising computer readable program code executable by a processor to implement a method as implemented in a software defined network (SDN) controller, the SDN controller communicating via a control plane and a data plane, the non-transitory medium comprising: computer readable program code receiving critical data flow requests; and computer readable program code processing the data flow requests and determining status and availability of capacity in the SDN to carry out each data flow request, and when status and/or availability of capacity in the SDN does not allow for a given data flow request to be completed and when the given data flow request is determined to be a critical data flow, the application logic utilizing a control channel in the control plane of the SDN to complete the critical data flow, and when status and/or availability of capacity in the SDN does allow for the given data flow request to be completed, the application logic utilizing a data channel in the data plane of the SDN to complete the given data flow request.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
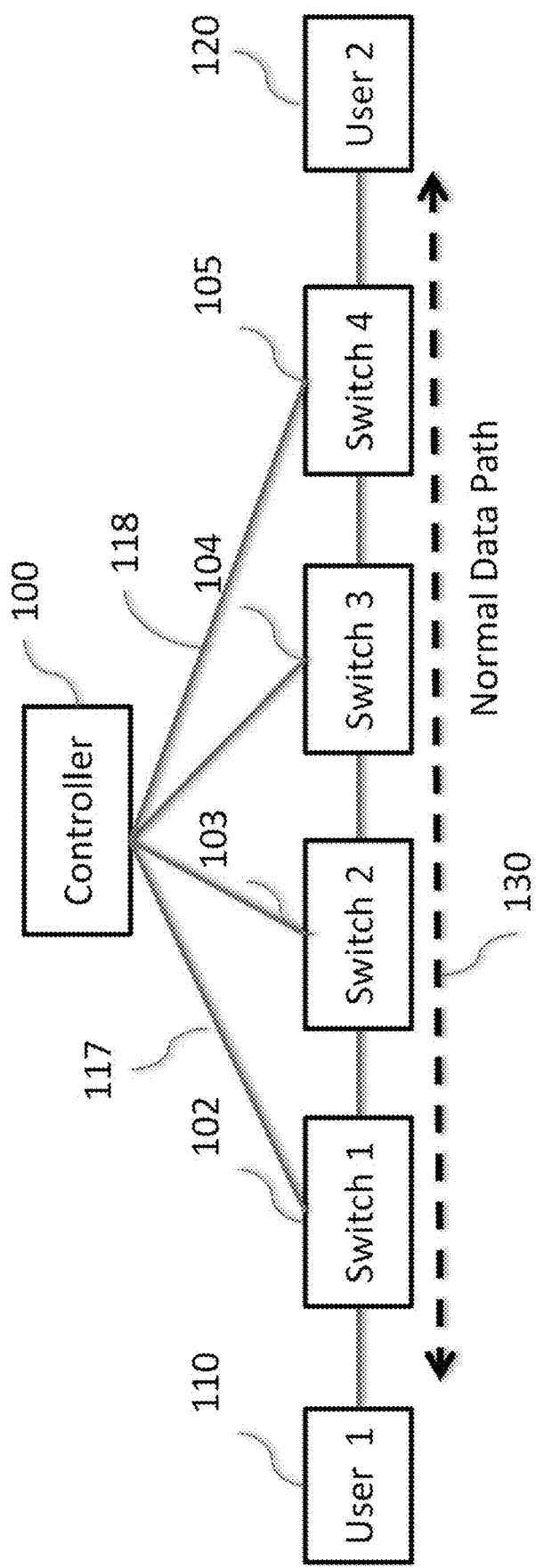
FIG. 1 illustrates a traditional data path according to prior art.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

SDN is a new approach for IP networking that allows decoupling of control and data planes. Decisions about traffic routing are performed at the control plane, while traffic forwarding according to the rules determined by the control plane is performed at the data plane. An SUN controller is the software where control plane decisions are performed. It may reside in a single computer or may be distributed to many computers. So called SDN applications' are written to interact with the controller to enable treatment of data plane routes differently based on specific application needs. The controller typically provides open Application Programming Interfaces (APIs) to interface with such applications. Traffic Management, for example, is an application which feeds real-time unprocessed or processed traffic data into the controller. Security Management is yet another application which feeds security requirements of certain data streams. Meanwhile, the controller may provide detailed or aggregated network views, or direct expressions of network behavior regionally or hourly, or a per-flow information to the requesting and authorized applications. These are just a few to name, and obviously there may be other types of information the controller may provide about the network.

The controller is a logically centralized entity in charge of:
 (i) translating the requirements obtained from an application down into the selection of a data path;
 (ii) providing applications with a central view of the network (which may include statistics and events); and (iii) communicating with the data network and other control network components. It is mainly comprised of a control logic, a control-to-data-plane interface, and an API set we alluded before for applications to program the controller. OpenFlow is a well-known and widely-used open control-to-data-plane communication protocol defined by the Open Networking Foundation [3].

The SDN data plane is where forwarding and data processing is performed. A switch in the data plane is primarily responsible for packet forwarding, but it can also perform traffic and event reporting to the controller on a per-interface or per-flow basis, and receives control decisions from the controller in real-time.

For the purposes of this invention, a prior art SDN domain is comprised of a controller, and many switches controlled by said controller in a star topology. The data network and the control network use different infrastructures so that the data traffic doesn't directly affect the control traffic.

FIG. 1 is a simple exemplifying prior art SDN network controlled by controller 100. When User 110 sends data to User 120, controller 100 makes a routing decision of a flow path through switches 102, 103, 104 and 105. Controller 100 sends the new forwarding rules to the switches along the path through control channels such as 117 and 118. Data path 130 follows the route determined by controller 100.

Figure 2:
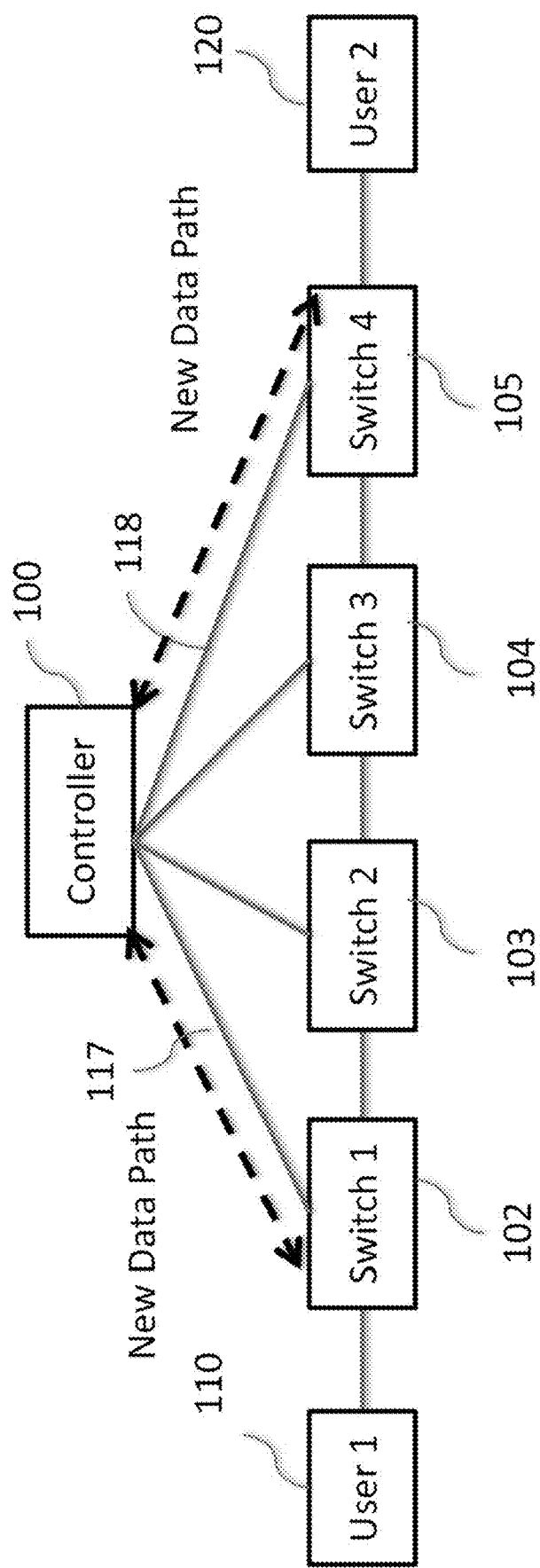
FIG. 2 illustrates the use of control channel for data path according to the present invention.

When the data network fails to supply the necessary quality of service (QoS) such as controlled throughput or latency/jitter along normal data path 130, or to provide a specified level of security, controller 100 determines a new flow path through itself according to FIG. 2. Note that the control channel 117 and 118 are normally reserved for the control messages. Therefore, it is inconceivable to direct all data traffic to the control channel. Only data that is deemed critical should be allowed. Therefore, the requesting user should be authenticated and authorized to have the 'privilege' to use the control channel for data transmission. The requested data should also qualify to be 'critical' according to some predefined criteria.

If the requested critical data traffic will negatively affect the control processes from which the controller is responsible, the data shouldn't be allowed to share the facilities of control channel. The controller, with the help of traffic management application, analyzes the possible effects of the request and accordingly makes a decision. If the user is authorized and the data is qualified, and if the control channel has available spare bandwidth to accommodate the critical data traffic the controller prepares corresponding flow tables and sends them to ingress and egress switches.

Figure 3:
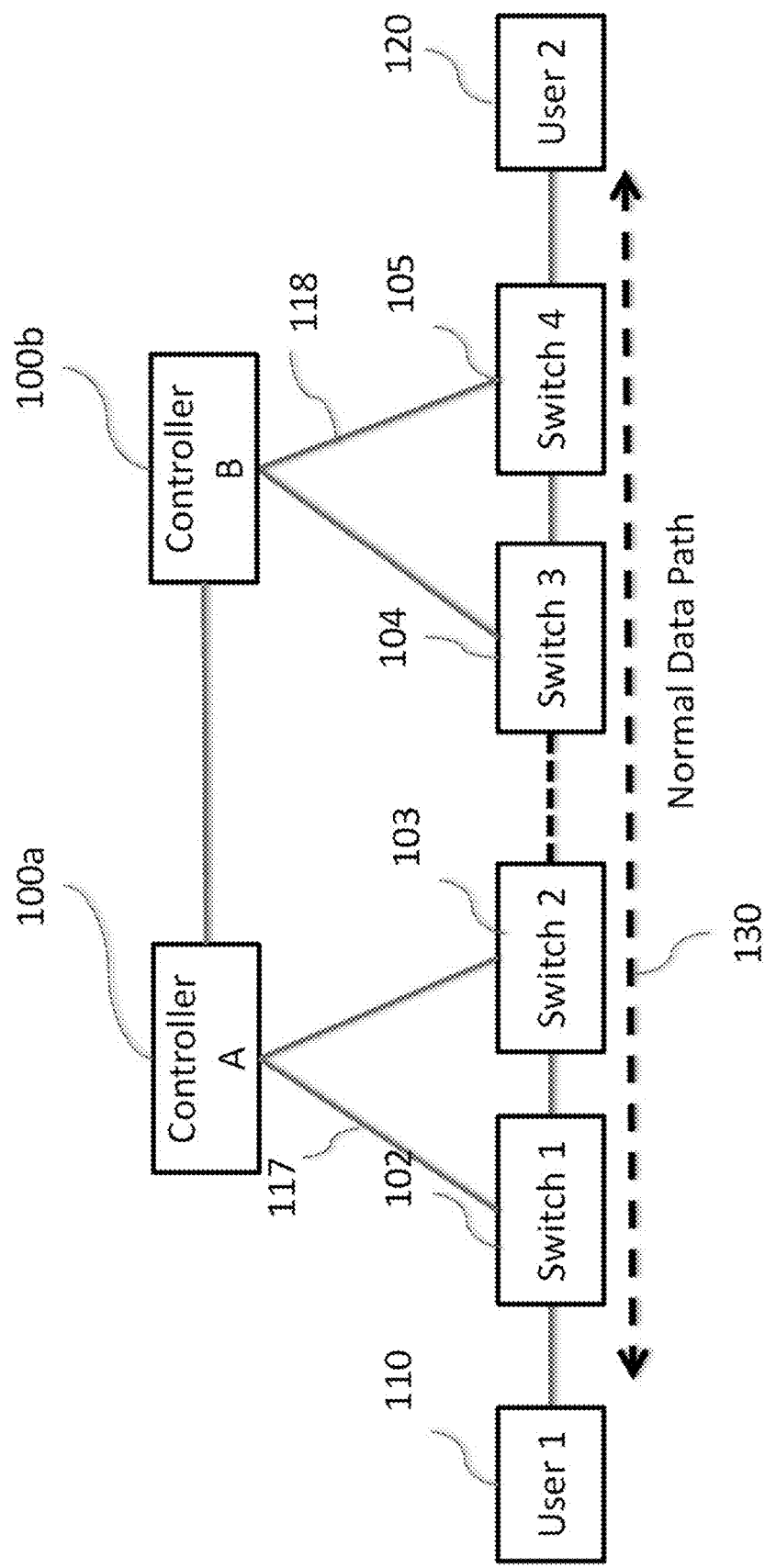
FIG. 3 illustrates a traditional data path according to prior art in a two-controller scenario.

FIG. 3 illustrates a more complex network scenario with two controllers, 100a and 100b servicing an SDN in a domain. These two controllers may be functionally identical but simply sharing control load. Controller 100a is controlling switches 102 and 103 while controller 100b is controlling switches 104 and 105. In addition to control channels represented by links 117 and 118, the control plane of this network has a controller-to-controller interface shown in FIG. 2 between 100a and 100b. Note that either one of the controllers 100a and 100b (master-slave operation) determines, or they collectively (peer-to-peer operation) determine the data path through switches 102, 103, 104 and 105 and communicate the corresponding flow table to the switches.

Figure 4:
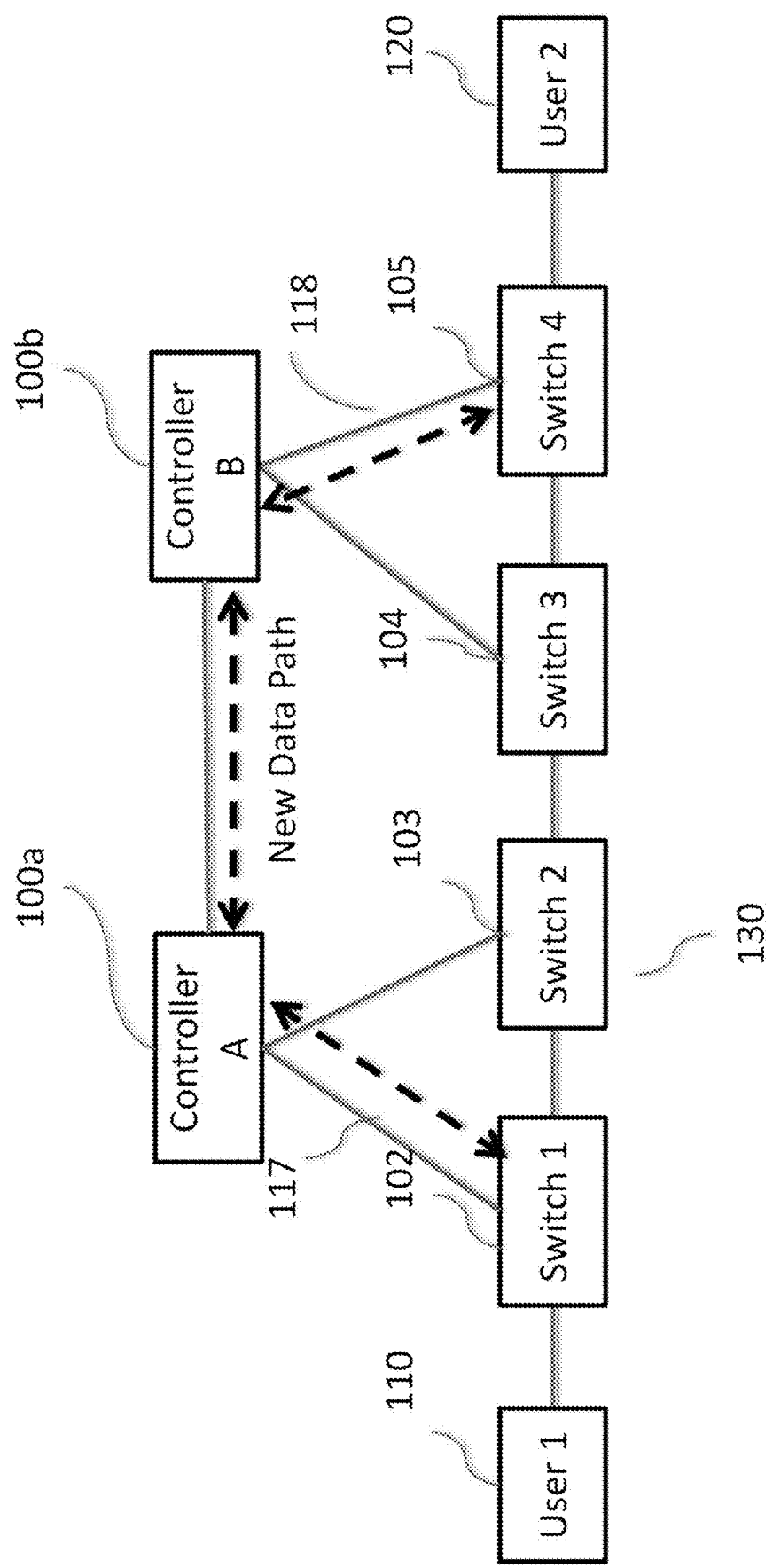
FIG. 4 illustrates the use of control channel for data path in a two-controller SDN scenario according to the present invention.

FIG. 4 illustrates the network scenario of FIG. 3 with both controllers 100a and 100b servicing an SDN according to an aspect of invention. The new data path for the critical data path is illustrated. Note that in addition to the two control channels between controller 100a and switch 102, and controller 100b and switch 104, there is an inter-controller link between controller 100a and 100b along the new data path.

SDN networking paradigm with a centralized control is favored mostly because of its optimized use of network resources. There is a global overseer, the controller that is aware of network resource availability and capable of instantly rerouting traffic. The overhead created by the control traffic is viewed as a tolerable disadvantage in this architecture. So far, no work has been done to utilize the precious control channel capacity for data transmission. This invention optimizes the network resources to a point of using the facilities of control channel as a viable alternative as a data path for some limited amount of critical data.

Figure 5:
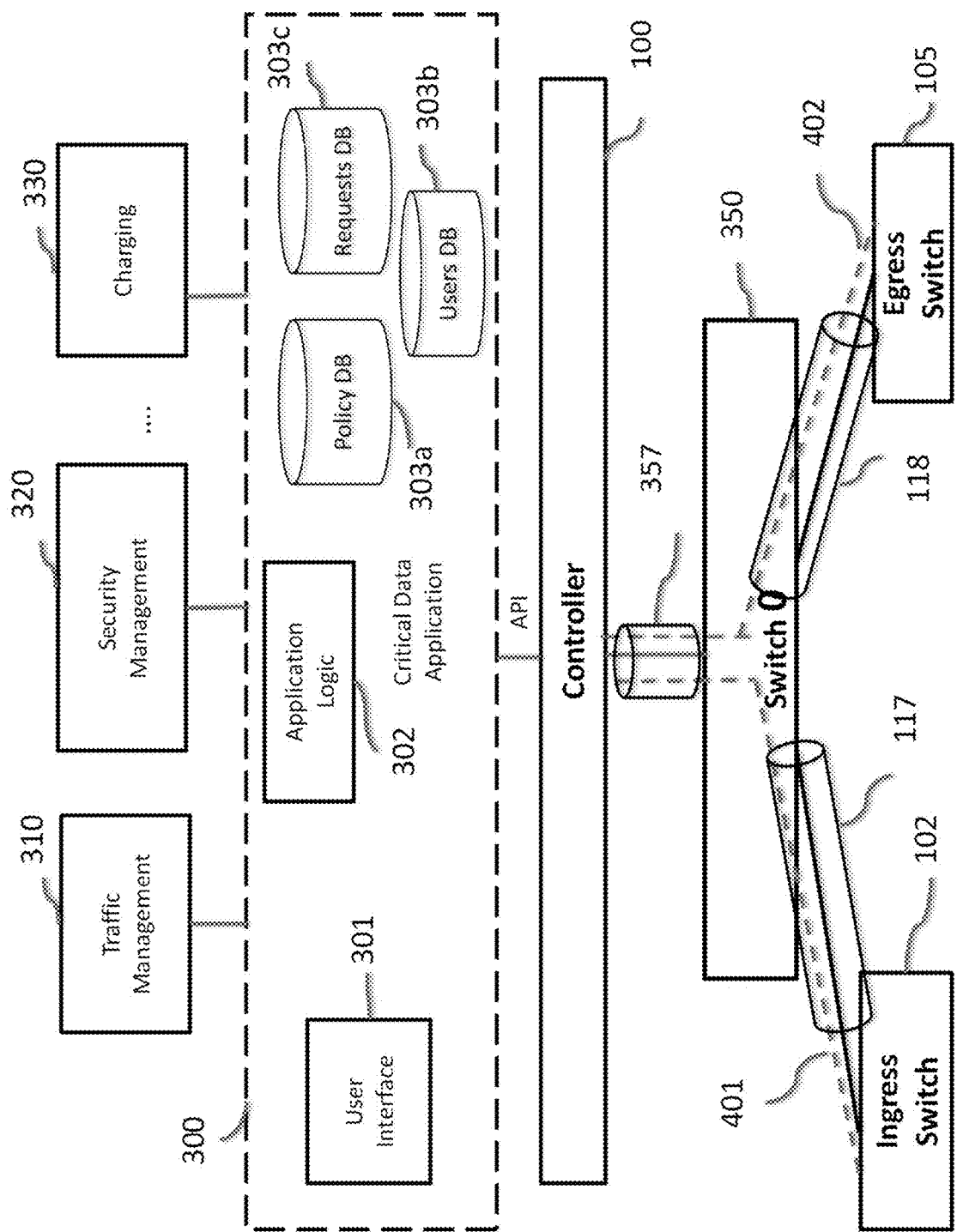
FIG. 5 illustrates the system diagram for the controller according to the present invention.

System 300 on FIG. 5 is the heart of this invention. System 300 is a software application that runs on controller 100, and connects to it via a controller API. It may run on the same computer with controller 100, or alternatively on another computer nearby or remote to the controller. System 300 also connects to other systems such as traffic management 310, security management 320 and charging gateway 330 as illustrated in FIG. 5. These auxiliary systems aid system 300 to make decisions. Although not described here, there may be other auxiliary systems attached to System 300.

System 300 is comprised of several key subcomponents:
(i) User interface 301 can be reached by the users from a computer or a handheld device such as a cellular phone. It enables users to sign in and make requests for critical data transmission, view status of their requested critical data transmission in the pipeline, modify and delete requests, and view and modify user profile, etc. User interface 301 would typically be a graphical user interface (GUI).
(ii) Application logic 302 is the core subcomponent of invention. It processes the critical data transmission requests entered by the users. It interacts with traffic management 310 to determine the status and availability of capacity in the data network to carry on a request. It computes latency/jitter and throughput along viable data paths for the critical data flow to determine the most optimal path. It also makes a determination if the control channel can provide the requested QoS. It interacts with security management 320 to fulfill special security needs of the critical data. The utilization of control channels to send data can be designed as a paid service. In that case Application logic 302 interacts with charging gateway 330 to charge the user for the use of control channels.
(iii) User database (DB) 303b contains the users' profiles and authentication information.
(iv) Policy database (DB) 303a contains general routing and charging policies as it pertains to the operator as well as specific routing and charging policies at certain regions/connections.
(v) Requests database (DB) 303c contains critical data path requests such as data originator and destination IP and/or MAC addresses, and/or host names, application types (video conferencing, media streaming, etc), required bandwidth, transmission begin and end times, other critical data transmission requirements such as latency, jitter, periodicity and security, and other types of applicable information regarding the data.

Another key enabler of this invention is deployment of a switch adjacent to each controller. We called this special switch, 'switch 0'. Although its function is identical to any other SDN switch in the data network, it also acts as a layer-2 hub (VLAN switch) to connect control channels between controller 100 and all switches of the network (i.e., switch 0, 102, 103, 104 and 105). Note that switch 0 is shown in FIG. 5 as component 350.

Controller 100 attaches to switch 350 with connection 357, which may be a local connection in the data center when switch 350 and controller 100 are co-located. Otherwise, connection 357 is a Wide Area Network (WAN) connection such as a metro fiber. Switch 350 connects to all network switches. For example, it connects to switch 102 with facility 117, and switch 105 with facility 118. The VLAN (or any other type of layer 2 connectivity) between the controller and switches 102 and 105, for example, as the control channel is depicted as VLAN links 401 and 402, respectively. Note that this VLAN is reserved strictly as the control channel carrying Openflow, and therefore has the highest priority and the pre-emption rights compared to any other traffic on links 117 and 118.

An exemplifying simple flow of this invention is as follows:

The user first makes a secure connection to system 300 through user interface 301 to register. Meanwhile, the user fills in the profile information such as the username and password, email address, phone number, location, credit card/charging information, etc. This information is strictly exemplary. There may be less or more information needed.

System 300 stores this information in user DB 303*b*.

At a later time, the user logs into system 300 using UI 301, and makes a critical data transmission request supplying the following sample information:

Current IP address of the user application's computer;
The endpoints (all endpoints if more than two) to which the requirements apply;
Type of service (video conferencing, streaming media, etc.) during data transmission;
Estimated sustained and peak bandwidth of the data transmission;
Maximum tolerable latency for the data transmission;
Maximum tolerable jitter for the data transmission;
Security requirements, such as encryption, if any.

Application logic 302 processes and stores the request into request DB 303*c*.

System 300 connects to traffic management 310, and security management 320 to realize the user's requirements at the start time of the data flow. There are several possible scenarios:

1—The data plane can fulfill the user requirements;
2—The data plane does not have sufficient resources to fulfill the requirements, but the control plane has.
3-Neither the data plane nor the control plane has sufficient resources.

If the first scenario above is viable, controller 100 converts the requirements into flow tables and sends them to switches along the data path using OpenFlow protocol. Thereafter, switches 102 and 105, and all of the other switches on the data path are programmed by controller 100 using control channels such as VLAN 401 and 402 connections.

If the second scenario above is viable, system 300 connects to controller 100 to program Switch 0, ingress switch 102 and egress switch 105 in order to utilize the control channel capacity for user's requested data communications. It may use the control channel for the critical data in-band (i.e., using Openflow), or out-of-band by constructing and MPLS tunnel or a Virtual Circuit on the facilities of the control channel. Accordingly, the control channel capacities are reduced for the next data transmission request along the same route at the same time interval.

Once the path is established and the data is completely transmitted according to the requirements, system 300 returns a positive acknowledgement to request DB 303*c* corresponding to the aforementioned request. Otherwise, a failure is reported.

When successful, system 300 forwards the CDR information to charging gateway 330 for billing.

The user is billed according to the CDR information and charging policies of 330.

As the last step, the request is deleted from the requests DB 303.

Figure 6:
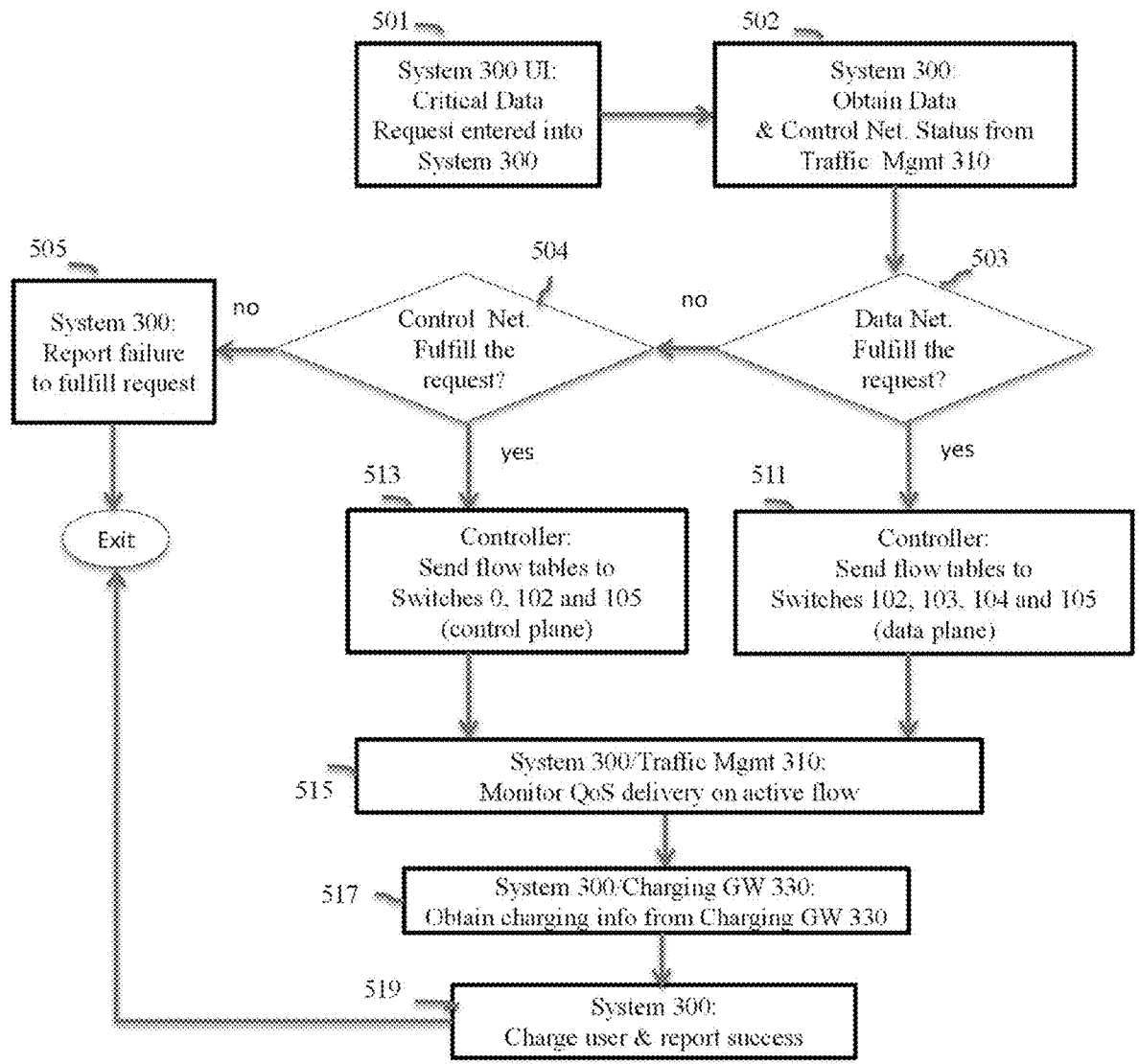
FIG. 6 illustrates the flow chart of the method according to the present invention.

The key steps of this flow are illustrated in the flow diagram of FIG. 6 for further clarity.

The process starts in step 501 when a new critical data request is entered into system 300. At the start time of the critical data flow, system 300 collaborates with traffic management 310 to make a determination for a path for the flow. First, in step 503, it checks to determine if there are any data plane paths available that meet the requirements of the request. If yes, in step 511, it generates the flow table and sends it to controller 100, which in turn sends the flow tables to switches 102, 103, 104 and 105. If no, in step 504, system 300 checks to determine if there is a path available on the control channels between the ingress and egress switch and the controller that meets the requirements of the request. If yes, in step 513, it generates the flow table and sends it to controller 100, which in turn sends the flow tables to switches 0, 102 and 105. If no, in step 505, a failure report is prepared and sent to the user. After the fulfillment, system 300 monitors the status of the request by collaborating with traffic management 310. After completion of the flow, system 300 collaborates with charging gateway 330 in step 517 and charges the user for the service in step 519 and completes the task.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The present invention provides an article of manufacture having non-transitory computer readable storage medium comprising computer readable program code executable by a processor to implement a method as implemented in a software defined network (SDN) controller, the SDN controller communicating via a control plane and a data plane, the non-transitory medium comprising: computer readable program code receiving critical data flow requests; and computer readable program code processing the data flow requests and determining status and availability of capacity in the SDN to carry out each data flow request, and when status and/or availability of capacity in the SDN does not allow for a given data flow request to be completed and when the given data flow request is determined to be a critical data flow, the application logic utilizing a control channel in the control plane of the SDN to complete the critical data flow, and when status and/or availability of capacity in the SDN does allow for the given data flow request to be completed, the application logic utilizing a data channel in the data plane of the SDN to complete the given data flow request.

CONCLUSION

A system and method has been shown in the above embodiments for the effective implementation of a system, method and article of manufacture for using control plane for critical data communications in software-defined networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A software defined network (SDN) controller in an SDN communicating via a control plane and a data plane, the SDN controller comprising:
a user interface receiving critical data flow requests; and
an application logic processing the data flow requests and determining status and availability of capacity in the SDN to carry out each data flow request, and when status and/or availability of capacity in the SDN does not allow for a given data flow request to be completed and when the given data flow request is determined to be a critical data flow, the application logic utilizing a control channel in the control plane of the SDN to complete the critical data flow, and when status and/or availability of capacity in the SDN does allow for the given data flow request to be completed, the application logic utilizing a data channel in the data plane of the SDN to complete the given data flow request,
wherein the SDN controller further comprises a switch that is a layer-2 hub to connect control channels between the SDN controller and other switches of the SDN forming a star topology, and
wherein the critical data flow is moved from a data channel to the control channel in the control plane of the SDN when status and/or availability of capacity in the SDN does not allow for the given data flow request to be completed.

2. The SDN controller of claim 1, wherein the status and availability of capacity in the SDN is determined according to a requested Quality of Service (QoS).

3. The SDN controller of claim 1, wherein the status and availability of capacity in the SDN is determined by computing latency/jitter and throughput along viable data paths in the SDN for the critical data flow.

4. The SDN controller of claim 1, wherein the SDN controller further comprises a user database storing user profiles and authentication information.

5. The SDN controller of claim 1, wherein the SDN controller further comprises a policy database storing general routing and charging policies pertaining to operators as well as specific routing and charging policies at regions/connections.

6. The SDN controller of claim 1, wherein the SDN controller further comprises a requests database storing one or more of the following: critical data path requests, data originator/destination IP addresses, originator/destination MAC addresses, originator/destination host names, application types associated with data to be transmitted, required bandwidth associated with data to be transmitted, transmission begin/end times associated with data to be transmitted, latency associated with data to be transmitted, jitter associated with data to be transmitted, periodicity associated with data to be transmitted, and security associated with data to be transmitted.

7. The SDN controller of claim 1, wherein utilizing the control channel in the control plane of the SDN is billed differently than utilizing the data channel in the data plane of the SDN.

8. The SDN controller of claim 1, wherein the control channel uses an OpenFlow channel.

9. The SDN controller of claim 1, wherein when the control channel is unable to complete the critical data flow request, the SDN controller sends the critical data flow request via an out-of-band channel.

10. The SDN controller of claim 9, wherein the out-of-band channel is any of the following: a tunnel, an MPLS tunnel, or a Virtual Circuit (VC).

11. A method as implemented in a software defined network (SDN) controller in an SDN, the SDN controller communicating via a control plane and a data plane, the method comprising:
receiving critical data flow requests; and
processing the data flow requests and determining status and availability of capacity in the SDN to carry out each data flow request, and when status and/or availability of capacity in the SDN does not allow for a given data flow request to be completed and when the given data flow request is determined to be a critical data flow, the application logic utilizing a control channel in the control plane of the SDN to complete the critical data flow, and when status and/or availability of capacity in the SDN does allow for the given data flow request to be completed, the application logic utilizing a data channel in the data plane of the SDN to complete the given data flow request, wherein the SDN controller further comprises a switch that is a layer-2 hub to connect control channels between the SDN controller and other switches of the SDN forming a star topology, and wherein the critical data flow is moved from a data channel to the control channel in the control plane of the SDN when status and/or availability of capacity in the SDN does not allow for the given data flow request to be completed.

12. The method of claim 11, wherein the status and availability of capacity in the SDN is determined according to a requested Quality of Service (QoS).

13. The method of claim 11, wherein the status and availability of capacity in the SDN is determined by computing latency/jitter and throughput along viable data paths in the SDN for the critical data flow.

14. The method of claim 11, wherein the method further comprises storing user profiles and authentication information in a database.

15. The method of claim 11, wherein the method further comprises storing, in a database, general routing and charging policies pertaining to operators as well as specific routing and charging policies at regions/connections.

16. The method of claim 11, wherein the method further comprises storing, in a database, one or more of the following: critical data path requests, data originator/destination IP addresses, originator/destination MAC addresses, originator/destination host names, application types associated with data to be transmitted, required bandwidth associated with data to be transmitted, transmission begin/end times associated with data to be transmitted, latency associated with data to be transmitted, jitter associated with data to be transmitted, periodicity associated with data to be transmitted, and security associated with data to be transmitted.

17. The method of claim 11, wherein utilizing the control channel in the control plane of the SDN is billed differently than utilizing the data channel in the data plane of the SDN.

18. The method of claim 11, wherein the control channel uses an OpenFlow channel.

19. The method of claim 11, wherein when the control channel is unable to complete the critical data flow request, the method further comprises sending the critical data flow request via an out-of-band channel.

20. The method of claim 19, wherein the out-of-band channel is any of the following:

a tunnel, an MPLS tunnel, or a Virtual Circuit (VC).

21. An article of manufacture having non-transitory computer readable storage medium comprising computer readable program code executable by a processor to implement a method as implemented in a software defined network (SDN) controller in an SDN, the SDN controller communicating via a control plane and a data plane, the non-transitory medium comprising:

computer readable program code receiving critical data flow requests; and computer readable program code processing the data flow requests and determining status and availability of capacity in the SDN to carry out each data flow request, and when status and/or availability of capacity in the SDN does not allow for a given data flow request to be completed and when the given data flow request is determined to be a critical data flow, the application logic utilizing a control channel in the control plane of the SDN to complete the critical data flow, and when status and/or availability of capacity in the SDN does allow for the given data flow request to be completed, the application logic utilizing a data channel in the data plane of the SDN to complete the given data flow request, wherein the SDN controller further comprises a switch that is a layer-2 hub to connect control channels between the SDN controller and other switches of the SDN forming a star topology, and wherein the critical data flow is moved from a data channel to the control channel in the control plane of the SDN when status and/or availability of capacity in the SDN does not allow for the given data flow request to be completed.

* * * * *